May 8, 1951 J. R. TURNER ET AL 2,552,238
PROFILE PROJECTOR AND OPTICAL COMPARATOR
Filed Dec. 9, 1948 4 Sheets-Sheet 1

JOHN R. TURNER
RUDOLF KINGSLAKE
INVENTORS
BY
ATTORNEYS

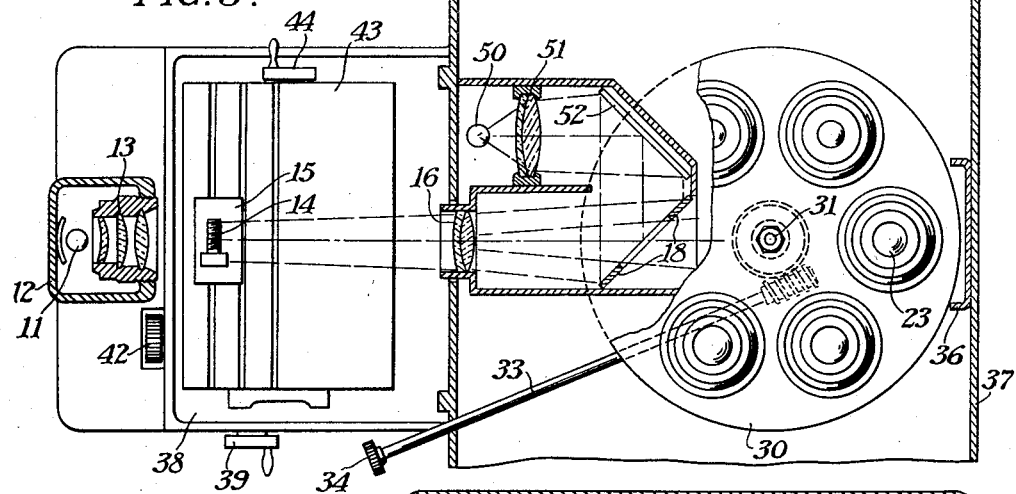
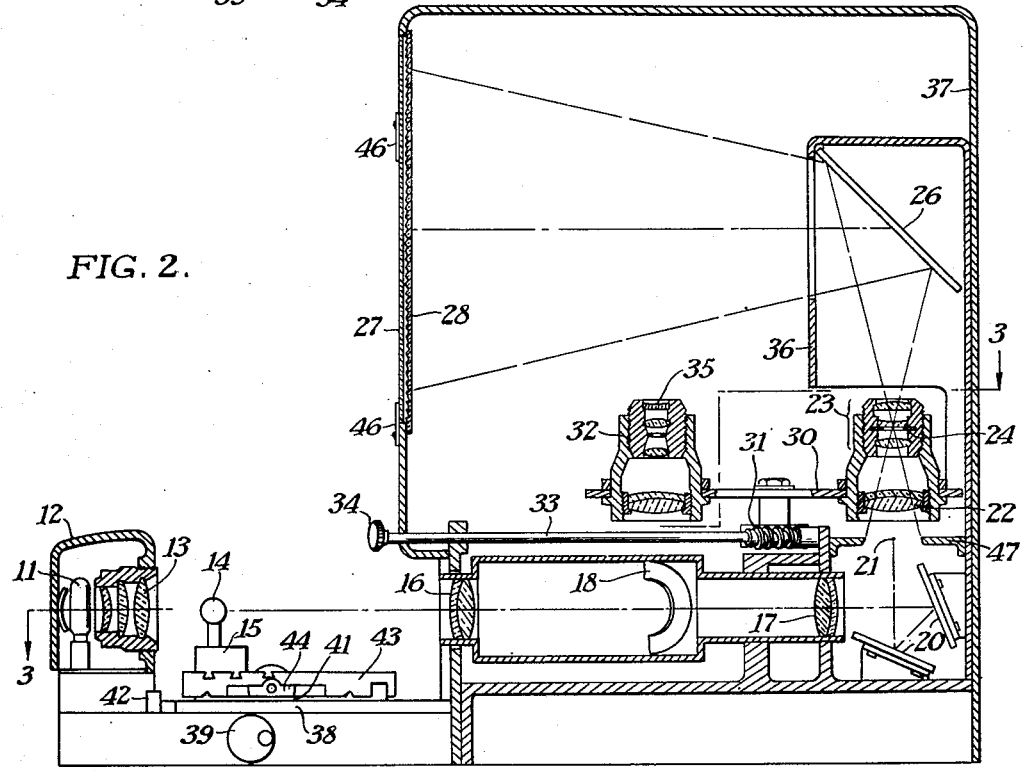

JOHN R. TURNER
RUDOLF KINGSLAKE
INVENTORS

May 8, 1951     J. R. TURNER ET AL     2,552,238
PROFILE PROJECTOR AND OPTICAL COMPARATOR
Filed Dec. 9, 1948     4 Sheets-Sheet 4

JOHN R. TURNER
RUDOLF KINGSLAKE
INVENTORS

BY *Newton M. Perrine*
*F. M. Emerson Holmes*
ATTORNEYS

Patented May 8, 1951  2,552,238

UNITED STATES PATENT OFFICE 2,552,238

PROFILE PROJECTOR AND OPTICAL COMPARATOR

John R. Turner and Rudolf Kingslake, Rochester, N. Y., assignors to Eastman Kodak Company, Rochester, N. Y., a corporation of New Jersey Application December 9, 1948, Serial No. 64,404

9 Claims. (Cl. 88—24)

This invention relates to profile projectors and optical comparators of the type generally used in machine shops for examining a magnified image of an object. In common with other instruments in this field, the article to be tested is placed on the work holder and is illuminated, and the image of the article, or of the profile thereof, is projected by a suitable optical system to a viewing screen for direct observation by the operator or for comparison with a master chart or fiducial member or other indicia.

The present invention has almost innumerable advantages over prior instruments in this field. One of the main objects of the invention is to provide a large working clearance between the object being tested and the first lens of the optical system. Among the advantages resulting from this feature is the possibility of having a simple attachment for converting from horizontal to vertical illumination of the work piece as described in patent application Serial No. 64,368, filed concurrently herewith by A. R. Fultz. Reference is also made to concurrently filed application Serial No. 64,406, by R. J. Hudak which utilizes this large working clearance for surface comparisons.

The following seven advantages are due to the long working distance provided by the present invention. First, it permits the optical projection of large objects or of objects having extensions thereon which would interfere with conventional lens systems.

Second, it allows simplification in design of staging fixtures or work holders since the fixture is not subject to interference with the mount or other physical elements of the optical system.

Third, the increased space permits much greater versatility in the design of fixtures for multiple staging or indexing, and fourth, the large working clearance permits greater freedom for the operator in loading and operating the staging fixtures, and it lessens the possibility of damage to the optics by work pieces which would otherwise be in close proximity to the lenses.

The fifth advantage is the one mentioned above in connection with the Fultz case, having to do with simple conversion from horizontal to vertical projection. Sixth, it allows the use of mechanical accessories such as dividing heads or sine bars, or, alternatively, it permits convenient adaptation of the instrument to machine tools such as grinders where the progress of the wheel against the work piece can be continuously observed. Seventh, it permits episcopic examination of the surface of the work piece either alone or particularly in comparison to a master surface for checking graininess and the like, as described in the Hudak case.

The object of another feature of the invention is to provide this large working distance or clearance and at the same time provide high magnification with relatively low overall optical distance between the work piece and the screen.

Still another feature of the invention is to provide various magnifications without changing the part of the optical system adjacent to the work piece either with respect to focus or other adjustments. As a result of this feature it is possible to use a common staging fixture for all magnifications of a given work piece.

One embodiment of this invention permits convenient projection of an image of the work piece and a master templet in combination.

A main object of one important embodiment of the invention is to provide a minimum of lens aberrations. This is accomplished mainly by using a relay lens system in which the first stage is a symmetrical one working at unit magnification. The symmetry automatically corrects distortion, coma and lateral color in the first stage of the relay system. The second stage is then separately corrected for various aberrations and may even involve the use of a field flattener.

Still further advantages are gained by making this first stage afocal. Even an unsymmetrical afocal system minimizes distortion and it can be made symmetrical by having two lenses of equal focal length separated by the sum of their focal lengths and symmetrically located between the object and the first image thereof. Among these further advantages is that proper focus is inherently maintained even when the first stage is moved accidentally; the symmetrical position is the best, but a slight shift from this position does not appreciably reduce the correction and reduces the relative aperture only very slightly. However, the main advantage of the afocal system arises when it is made telecentric. Any telecentric system has advantages (e. g. constant magnification even for parts of the object which are out of focus) but an afocal one is telecentric both ways giving constant magnification at all object distances and at all image distances.

The telecentric feature thus provides certain advantages particularly when combined with the afocal feature.

Still another object of the invention is to provide such a highly efficient optical system and such a level of screen brightness, that no hoods are necessary over the screen even in a normally lighted room. Substantially uniform screen brightness is obtained even with high magnification and short over-all length between the work piece and the screen.

Other objects and advantages of the present invention result when the invention is combined with those of Hudak and Fultz in the two patent applications mentioned above.

According to the present invention, these objects and advantages are obtained by the combination of the following features.

Between the illuminated work piece and the screen, two complete objective systems are provided. The first forms an aerial image of the work piece and the second relays this image to the screen. The first has a long front focus, preferably greater than 6″ and it preferably works at unit magnification to insure no distortion in the first aerial image. Note that this means that if the first objective were an ordinary lens system, working at one to one magnification, it should have a focal length greater than 3″, but the use of an ordinary lens is definitely undesirable compared to the preferable form of the invention.

Preferably this first objective system is an afocal telecentric one consisting of two lenses separated by the sum of their focal lengths with the effective stop of the objective located in the mutual focal plane of the two lenses. Either the afocal feature or the telecentric feature is valuable in optical comparators and this simple manner of combining both features into one system gives highly desirable results. If this system is made to give unit magnification by having the two lenses of equal focal length, and is symmetrically located between the object and the image, distortion, lateral color and coma are automatically corrected. The afocal feature provides a desirable lack of sensitivity to maladjustment since the system may be moved as a unit along the optic axis all the way from contact with the object to contact with the first aerial image without affecting the magnification. The correction of the lens aberrations and the effective aperture do change however, but these changes are small for small shifts of the optical system from its symmetrical position between the work piece and the aerial image.

The working distance is entirely due to the first objective system and is independent of the magnification provided by the second objective system. On the other hand, this second system can be of very short focal length providing high magnification in a short, overall distance, since it is quite permissible to place the second objective system near the aerial image.

The second objective system should also be a telecentric system although there would be little purpose in having it afocal. We prefer to use an ordinary objective. The use of an ordinary objective in this system is permissible if a field lens is included at the aerial image for focusing the stop of the first objective system in the stop of the second objective system. This provides the necessary telecentric system. An ordinary objective as the term is here used, refers to one having its stop internal, i. e., between its vertices. One form of the present invention permits a master reticle or chart or other indicia to be placed in the plane of the first aerial image for direct accurate comparison therewith. That is, both the reticle and the image will appear equally magnified and superimposed on the screen after relay by the second objective. In this particular arrangement, the field lens cannot be exactly in the image plane since it would then interfere with the reticle and is preferably between the image plane and the second objective. When the first objective system is telecentric toward the second one, the image of the stop thereof as seen by the second objective is at infinity. To focus this stop into the stop of the second objective system, the field lens should be optically at its own focal length in front of the internal stop of the second objective system.

One of the advantages of the present system is the fact that the magnification is entirely due to the second objective and may be changed merely by using interchangeable lenses at this point. Even though the distance between the aerial image and the screen is substantially fixed, a range of magnifications is thus very conveniently provided, and a shifting from one magnification to the other does not change the focus or adjustment of the comparator. Since the main purpose of an optical comparator is to give high magnification and since the purpose of this present invention is to gain this magnification with short over-all length without sacrifice of working distance, even the weakest of the interchangeable lenses should have a focal length less than the focal length of the first objective system when a simple objective is used or less than one-half the working distance when either a simple objective or an afocal system is used.

With a short over-all length, and particularly with high magnification, a large viewing screen is liable not to appear uniform to the observer. That is, the second objective system in such cases is covering a wide angle and, therefore, the observer would normally see a "hot spot." According to a preferred feature of the present invention, this non-uniformity of screen brightness is overcome by placing a Fresnel lens to act as a field lens substantially at the screen, preferably the Fresnel lens is behind the diffusing surface for two reasons. The Fresnel lens is protected from dust by the screen and, therefore, no additional protection is necessary, and, second, the structure of the Fresnel lens is not apparent to the observer even under close examination.

Although for most purposes, an optical comparator is designed to work at its maximum aperture to obtain maximum screen brightness, there are some occasions when it is desirable to sacrifice some of the screen brightness to obtain a greater depth of field. In the present optical system this may conveniently be accomplished without affecting the optical correction of the system, the magnification of the various parts of the work piece, or any other of the other highly desirable features of the invention, by placing an adjustable diaphragm at the telecentric stop in the mutual focal plane of the afocal system. This stop and the diaphragm may be oblique to the optic axis without seriously affecting the image quality and the preferred form of the Hudak episcopic system mentioned above has the stop oblique.

The following description of the most preferred embodiments of the invention should be read in connection with the accompanying drawings in which:

Fig. 2 is a side elevation partly in section of the comparator shown in Fig. 1.

Fig. 3 is similarly a plan view partly in section of the comparator shown in Fig. 1.

Figure 4:
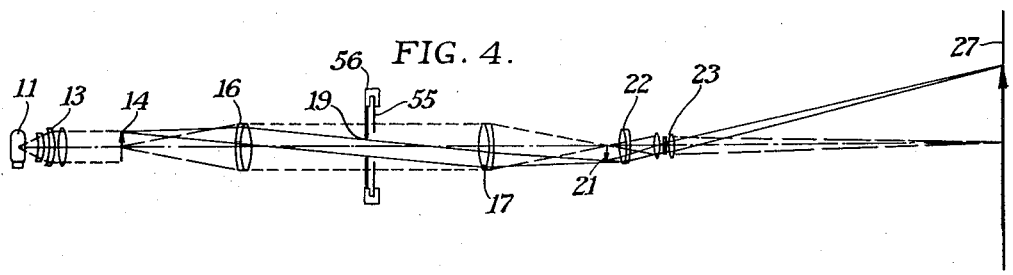
Fig. 4 shows the optical system of said comparator drawn approximately to scale (without reflectors).
Figure 4A:
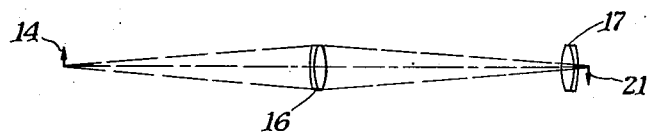
Figure 4B:
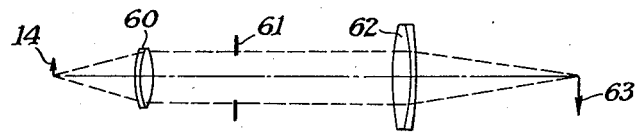
Figure 4C:
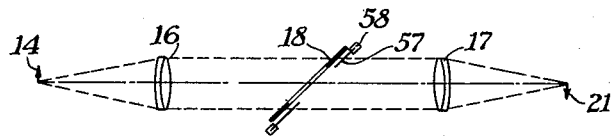

Figs. 4A, 4B, and 4C show alternative arrangements of the first relay stage of the optical system shown in Fig. 4.

Figure 5:
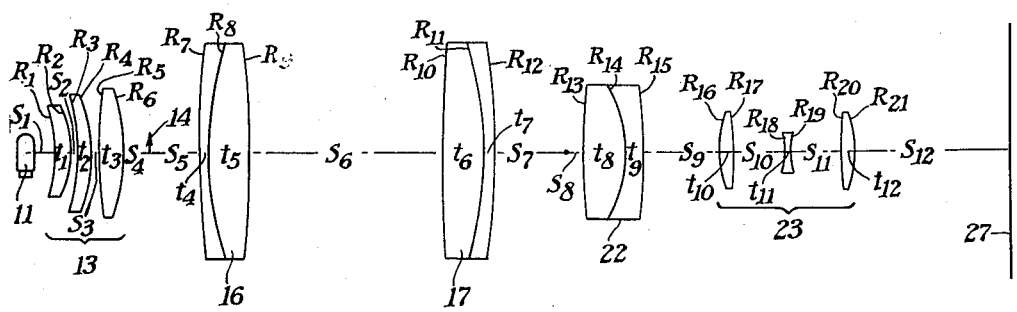

Fig. 5 is similar to Fig. 4, but the optical elements are shown greatly enlarged compared to the spaces therebetween, for clarity.

Figure 6:
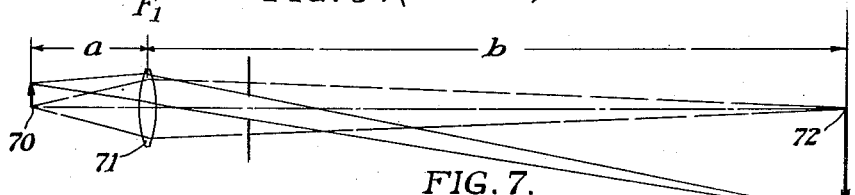
Figure 7:
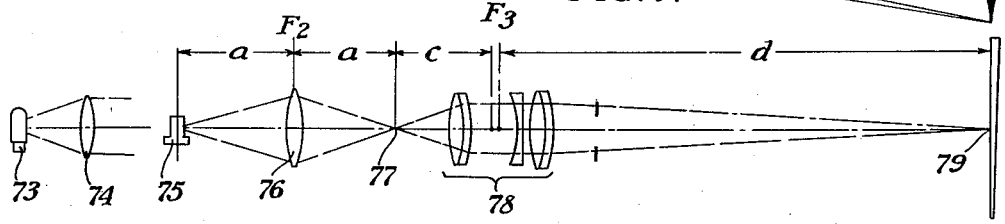
Figure 8:
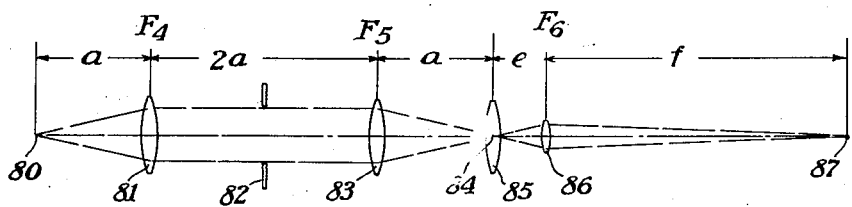

Figs. 6, 7 and 8 show various optical systems to permit direct comparison of their magnifying ability under various conditions; Fig. 6 represents the prior art, Fig. 7 represents a simple relay system, and Fig. 8 represents the preferred form of present invention corresponding to Figs. 1 to 5 inclusive.

Figure 9:
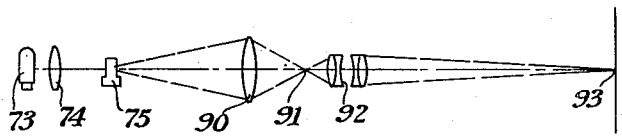
Figure 10:
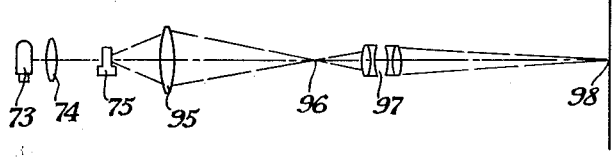

Figs. 9 and 10 show alternative arrangements of the first relay stage of the optical system of Fig. 7.

Figure 1:
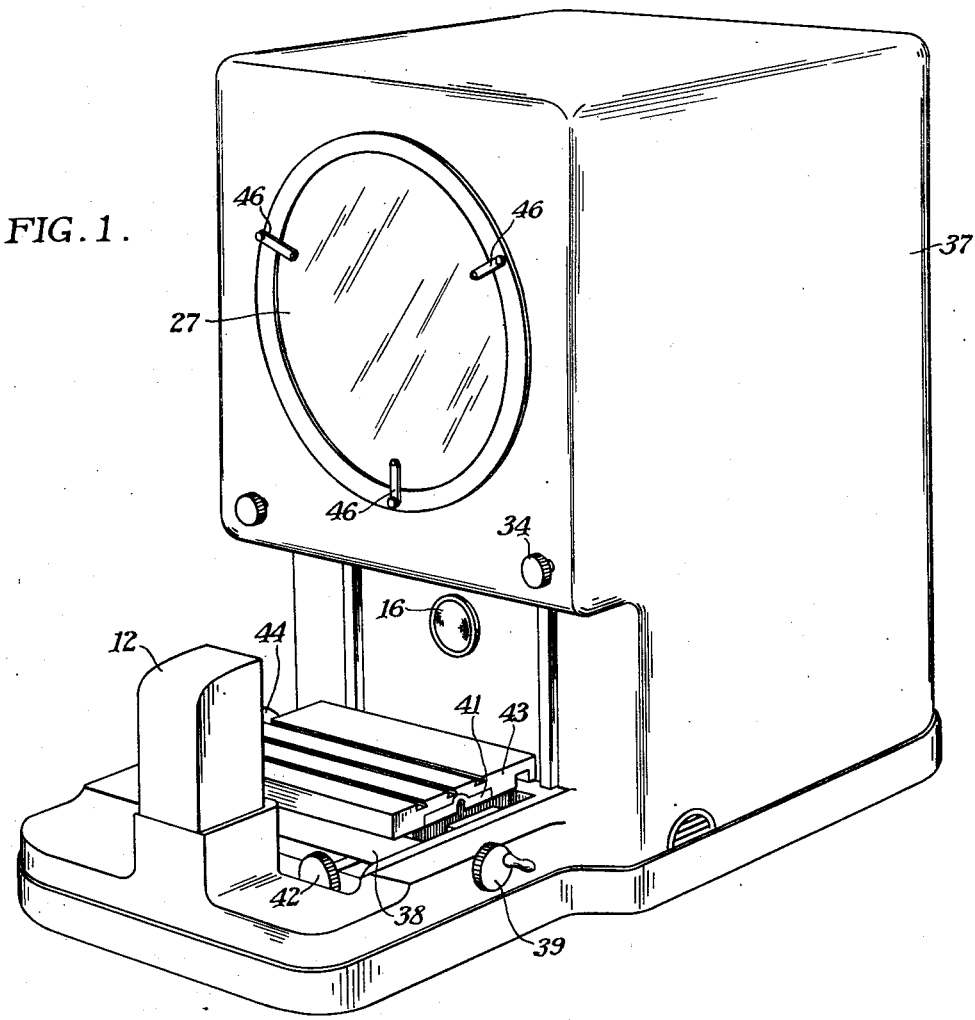
Fig. 1 is a perspective view of an optical comparator incorporating the present invention.

The object under test does not appear in Fig. 1, but Figs. 1, 2 and 3 will all be described together. Light from a lamp 11 in a lamphouse 12 is rendered substantially parallel by a condenser lens 13 and serves to illuminate the profile of a work piece 14 carried on a fixture 15. Light from the work piece is focused by an afocal system consisting of lenses 16 and 17 to form an aerial image 21, after reflection by a pentareflector 20. The lenses 16 and 17 have equal focal lengths and are separated by the sum of their focal lengths with the effective stop 18 located in the mutual focal plane of the two lenses 16 and 17. This arrangement renders the system telecentric in both directions so that all portions of the object 14 whether in focus or not are equally magnified and in the embodiment shown the image at the point 21 can be compared with a standard reticle even if the standard is not accurately located in the plane of the image 21. Since the lenses 16 and 17 are of equal power, the image 21 has unit magnification. The afocal system may be moved along the optical axis either toward or away from the object 14, without affecting either the location or magnification of the image 21. This is a property of unit-magnification afocal systems. However, in order to maintain the maximum relative aperture and complete correction of distortion, coma and lateral color it is preferable to have the afocal system symmetrically located between the object 14 and the image 21. That is, the optical distance from 14 to 16 should equal the optical distance from 17 to 21.

A field lens 22 located substantially at the image plane 21 focuses the stop 18, or more exactly, the image thereof, into the internal stop 24 of an ordinary objective 23. In some systems, maximum correction of aberrations requires the fields lens 22 to be right at or so close to the image plane 21 that the comparison reticle feature must be omitted but it is of minor importance anyway. The objective 23 relays the image from the point 21 via a reflecting surface 26 and forms a greatly enlarged image thereof on a rear projection screen 27. Since one of the purposes of the present invention is to obtain high magnification in a small instrument, the objective 23 covers a relatively wide angle which normally would tend to introduce uneven brightness of the image on the screen 27 as viewed from the front. To overcome this, a Fresnel lens 28 is positioned immediately behind the screen 27 to act as a field lens for the image formed on this screen. It will be noted that the working distance between the object 14 and the lens 16 depends only on the focal length of the lens 16, whereas the magnification of the system depends only on the focal length of the lens 23. Thus large working distance and high magnification in short over-all length are obtained by selecting a large focal length for lens 16 and a small focal length for the lens 23. As will be pointed out in a later analysis, some advantages are gained at high magnifications even when these focal lengths are equal. Various magnifications are obtained by substituting various focal length lenses for the second objective lens system 23.

In the arrangements shown in Figs. 2 and 3, a turret 30 of lenses is provided carrying six interchangeable lenses one of which is the lens 23 and another of which is labelled 32. It should be noted that each of the interchangeable lens systems includes its own field lens and in each case the field lens is located at its own focal length in front of the internal stop of the objective lens used. In order to provide some clearance between the field lens and the image 21, the higher magnification objectives such as 32 include a negative lens 35. The turret 30 is mounted to rotate on a suitable bearing 31 and rotation is provided through a shaft 33 having a worm drive engagement with the turret 30, by a knob 34 conveniently located on the front of the instrument.

In order to provide motion of the object 14 in any of the three directions, the fixture 15 is carried on a work holder consisting of a table 38 which is raised and lowered by a simple jack mechanism by rotation of the knob 39. This table 38 carries with it an intermediate table 41 which can be moved longitudinally on the optic axis by a simple nut and screw arrangement operated by knob 42 which moves up and down with the table 38. The top table 43 rides on the intermediate table 41 and is moved transversely by a simple nut and screw arrangement operated by knob 44.

The optical system is carried by a relatively rigid framework 36 and the whole instrument is provided with a housing 37. Comparison charts may be mounted on the screen 27 and held there by clips 46. A horizontal shelf 47 is provided in the plane of the image 21 to support a comparison reticle or chart for direct comparison with the image (both the image and the reticle appearing enlarged on the screen 27).

Alternative to the profile illumination from the lamp 11, it is often desirable to make episcopic examinations of an object such as the object 14. One very convenient manner of doing this according to the invention of Hudak mentioned above is illustrated in Fig. 3. Light from a lamp 50 is rendered parallel by a large condenser 51 and is reflected by a mirror 52 to a ring-shaped reflector 18 the aperture in which serves as the telecentric stop of the afocal system just described. This light is then reflected by the reflector 18 through the lens 16 to illuminate the object 14 from the front and for all practical purposes this illumination is normal with respect to the light going from the object 14 back through the optical system to the screen 27. This arrangement is found to be many times superior to any episcopic system in which the light strikes the object at high obliquity and hence low efficiency as far as producing image-forming light is concerned. For example, if the light strikes the object 14 at an angle of 45° to the optical system, the specularly reflected light from the front surface of the object is completely lost and passes off to one side of the optical system. With the present illumination, on the other hand, the specularly reflected beam is utilized for all parts of the object which are approximately normal to the optic axis. The actual improvement obtained is highly significant and should be seen to be appreciated fully.

Fig. 4 shows this same optical system laid out linearly and approximately to scale. The image 14 and object 21 are shown as simple arrows in the customary manner. The stop of the afocal system is simply shown by an aperture 19 which, in this case, is not shown obliquely as it appears in Figs. 2 and 3. The telecentric action of the lenses is illustrated by including lines representing rays from the head of the arrow 14. Although for most purposes it is desirable always to work at maximum relative aperture, there are some instances where the operator may wish to sacrifice brightness in order to obtain greater depth of field. In the present optical system this may conveniently be obtained by placing an adjustable diaphragm 55 and its adjusting mechanism 56 immediately adjacent to the stop 19.

As shown in Fig. 4A the unit magnification of the image 21 is maintained even when the lenses 16 and 17 are shifted together along the optic axis. A greater working distance would be obtained thereby but since the relative aperture is reduced and certain lens aberrations are increased, and particularly since the present invention allows the selection of as large a working system as desired anyway, the symmetrical arrangement shown in Fig. 4 is preferable.

As shown in Fig. 4B the unit magnification stage of the optical system may be replaced by one which gives double magnification, making the image 63 twice as large as the object 14, simply by employing an afocal telecentric system in which the lens 62 has a focal length twice that of the lens 60 and the effective stop is only one-third of the distance from the lens 60 to the lens 62. Such a hemi-symmetrical system does have reduced aberrations and many of the other advantages of the unit magnification arrangement, but still it is less preferable than the unit magnification system shown in Fig. 4. Fig. 4C is included to show the oblique telecentric stop 18 provided with an adjustable diaphragm 57 and its adjusting mechanism 58. To be symmetrical with respect to the optic axis, the actual aperture in the member 18 should be elliptical, but for all practical purposes it is quite satisfactory to use a round aperture and to use an adjustable diaphragm 57 which also gives an approximately round aperture.

Fig. 5 shows the same arrangement as Fig. 4, but the individual lenses are greatly enlarged compared to the distances between for clarity. The lenses have the following specifications:

Condenser 13:

| Lens | $N_D$ | Glass | Radii | Spacings |
|---|---|---|---|---|
| 1 | 1.5214 | Heat Absorbing. | $R_1=-33.0$ mm. | $S_1=30.1$ mm. |
|   |        |                 | $R_2=-23.4$     | $t_1=5.7$ |
| 2 | 1.4718 | Pyrex           | $R_3=-53.3$     | $S_2=1.0$ |
|   |        |                 | $R_4=-34.2$     | $t_2=4.2$ |
| 3 | 1.4718 | do              | $R_5=+341.2$    | $S_3=1.1$ |
|   |        |                 | $R_6=-49.3$     | $t_3=7.8$ |
|   |        |                 |                 | $S=127.0$ |

Afocal objective system 16 and 17:

| Lens | $N_D$ | V | Radii | Spacings |
|---|---|---|---|---|
| 1 | 1.6890 | 30.9 | $R_7=+196.0$ mm. | $S_5=203.1$ mm. |
|   |        |      | $R_8=+74.3$       | $t_4=5.5$ |
| 2 | 1.5725 | 57.4 | $R_9=-196.2$      | $t_5=9.3$ |
|   |        |      |                   | $S_6=405.6$ |
| 3 | 1.5725 | 57.4 | $R_{10}=+196.2$   | $t_6=9.3$ |
|   |        |      | $R_{11}=-74.3$    | $t_7=5.5$ |
| 4 | 1.6890 | 30.9 | $R_{12}=-196.0$   | $S_7=203.1$ |

Field lens 22:

| Lens | $N_D$ | V | Radii | Spacings |
|---|---|---|---|---|
| 1 | 1.6203 | 60.3 | $R_{13}=+201.2$ mm. | $S_8=19.5$ mm. |
|   |        |      | $R_{14}=-25.6$       | $t_8=12.8$ |
| 2 | 1.6490 | 33.8 | $R_{15}=-64.6$       | $t_9=3.1$ |

Second objective system 23:

| Lens | $N_D$ | V | Radii | Spacings |
|---|---|---|---|---|
| 1 | 1.6203 | 60.3 | $R_{16}=+24.7$ mm. | $S_9=44.4$ mm. |
|   |        |      | $R_{17}=-280.4$     | $t_{10}=3.8$ |
| 2 | 1.6170 | 36.6 | $R_{18}=-20.9$      | $S_{10}=13.2$ |
|   |        |      | $R_{19}=+26.1$      | $t_{11}=1.2$ |
| 3 | 1.6203 | 60.3 | $R_{20}=+160.4$     | $S_{11}=12.2$ |
|   |        |      | $R_{21}=-30.7$      | $t_{12}=3.1$ |
|   |        |      |                     | $S_{12}=654.8$ |

This system gives 10:1 magnification. The following systems, each complete with its own field lens may be substituted to give the various magnifications indicated and optically occupying exactly the same space between the aerial image 21 and the screen 27. If any lens in manufacture does not turn out to have exactly the focal length specified, even after the usual adjustment of internal airspaces, this is corrected by focusing it carefully when mounting it in the turret. Any slight variation in magnification caused thereby is quite negligible.

For 20:1 magnification:

| Lens | $N_D$ | V | Radii | Spacings |
|---|---|---|---|---|
| 1 | 1.6203 | 60.3 | $R_{13}=+137.8$ mm. | $S_8=8.1$ mm. |
|   |        |      | $R_{14}=-11.9$        | $t_8=8.5$ |
| 2 | 1.6490 | 33.8 | $R_{15}=-35.9$        | $t_9=2.3$ |
|   |        |      |                       | $S_9=25.2$ |
| 3 | 1.6203 | 60.3 | $R_{16}=+13.3$        | $t_{10}=3.6$ |
|   |        |      | $R_{17}=-152.4$       | $S_{10}=7.1$ |
| 4 | 1.6170 | 36.6 | $R_{18}=-11.6$        | $t_{11}=.8$ |
|   |        |      | $R_{19}=+14.6$        | $S_{11}=6.8$ |
| 5 | 1.6203 | 60.3 | $R_{20}=+119.6$       | $t_{12}=2.2$ |
|   |        |      | $R_{21}=-17.5$        | $S_{12}=703.0$ |

For 31¼:1 magnification:

| Lens | $N_D$ | V | Radii | Spacings |
|---|---|---|---|---|
| 1 | 1.6203 | 60.3 | $R_{13}=+57.1$ mm. | $S_8=5.8$ mm. |
|   |        |      | $R_{14}=-8.0$       | $t_8=5.6$ |
| 2 | 1.6490 | 33.8 | $R_{15}=-23.5$      | $t_9=1.5$ |
|   |        |      |                     | $S_9=16.5$ |
| 3 | 1.6203 | 60.3 | $R_{16}=+9.0$       | $t_{10}=2.4$ |
|   |        |      | $R_{17}=-99.8$      | $S_{10}=5.0$ |
| 4 | 1.6170 | 36.6 | $R_{18}=-7.6$       | $t_{11}=.6$ |
|   |        |      | $R_{19}=+9.5$       | $S_{11}=4.4$ |
| 5 | 1.6203 | 60.3 | $R_{20}=+62.7$      | $t_{12}=1.8$ |
|   |        |      | $R_{21}=-11.9$      | $S_{12}=724.5$ |

For 50:1 magnification an additional negative lens is included between $R_{21}$ and the screen so as to keep $S_8$ reasonably large even when changing to the short focal length necessary for this magnification:

| Lens | $N_D$ | V | Radii | Spacings |
|---|---|---|---|---|
| 1 | 1.6203 | 60.3 | $R_{13}=+28.5$ mm. | $S_8=7.5$ mm. |
|   |        |      | $R_{14}=-6.7$        | $t_8=4.2$ |
| 2 | 1.6490 | 33.8 | $R_{15}=-24.9$       | $t_9=1.1$ |
|   |        |      |                      | $S_9=3.9$ |
| 3 | 1.6203 | 60.3 | $R_{16}=+7.2$        | $t_{10}=2.5$ |
|   |        |      | $R_{17}=-183.8$      | $S_{10}=3.7$ |
| 4 | 1.6170 | 36.6 | $R_{18}=-5.7$        | $t_{11}=.9$ |
|   |        |      | $R_{19}=+7.1$        | $S_{11}=3.3$ |
| 5 | 1.6203 | 60.3 | $R_{20}=+24.1$       | $t_{12}=2.2$ |
|   |        |      | $R_{21}=-7.5$        | $S_{12}=5.8$ |
| 6 | 1.6170 | 55.0 | $R_{22}=-65.3$       | $t_{13}=.9$ |
|   |        |      | $R_{23}=+65.3$       | $S_{13}=731.2$ |

A similar lens giving 62.5:1 magnification has the following specifications:

| Lens | $N_D$ | V | Radii | Spacings |
|---|---|---|---|---|
| 1 | 1.6203 | 60.3 | $R_{13}=+\ 27.0$ mm. $R_{14}=-\ 5.1$ | $S_8=\ 5.8$ mm. $t_8=\ 3.4$ |
| 2 | 1.6490 | 33.8 | $R_{15}=-\ 20.0$ | $t_9=\ .9$ $S_9=\ 3.1$ |
| 3 | 1.6203 | 60.3 | $R_{16}=+\ 5.6$ $R_{17}=-148.1$ | $t_{10}=\ 2.2$ $S_{10}=\ 3.0$ |
| 4 | 1.6170 | 36.6 | $R_{18}=-\ 4.5$ $R_{19}=+\ 5.8$ | $t_{11}=\ .8$ $S_{11}=\ 2.7$ |
| 5 | 1.6203 | 60.3 | $R_{20}=+\ 22.0$ $R_{21}=-\ 5.9$ | $t_{12}=\ 1.7$ $S_{12}=\ 4.7$ |
| 6 | 1.6160 | 49.2 | $R_{22}=-\ 52.6$ $R_{23}=+\ 52.6$ | $t_{13}=\ .8$ $S_{13}=739.1$ |

The lens giving 100:1 magnification is similar in design to the ones for 50:1 and 62.5:1 but is of shorter focal length. The reason that 31¼ and 62½ are included in the series is because thousandths of an inch at the object appear in thirty-seconds and sixteenths of an inch at the screen, which feature appeals to workmen using the instrument. These particular lens formulas are merely given for completeness of disclosure, but any well corrected telecentric lenses of proper focal length and covering power may be used.

Figs. 6 to 8 are mainly to illustrate the mathematical analysis of the invention, bringing out some of the very useful relationships involved, many of which are quite surprising. The general "thin-lens" formulas for each system are listed first and then some examples of what this means in practice are given.

Fig. 6 shows a simple, prior art, single objective system in which $$\text{Magnification } M_1 = \frac{b}{a}$$

Overall length $L_1 = a + b = a(1+M_1)$

"$a$" represents the working clearance of the system and, since this is dictated by the purpose to which the instrument is to be put, it is taken as the same for all systems. Light from the object at the point 70 is focused by objective 71, whose focal length is $F_1$, at the point 72.

Fig. 7 shows a simple relay system. A lamp 73 through a condenser lens 74 illuminates the profile of an object 75. Light from this object 75 is focused, at unit magnification, at point 77 by objective 76 (focal length $F_2$). The aerial image at the point 77 is refocused by a second objective 78, shown as a telecentric objective, onto a screen 79. The second objective has a focal length $F_3$.

In this relay system:

$$\text{Magnification } M_2 = \frac{d}{c}$$

Overall length (75 to 79) $L_2 = 2a+c+d$ $$F_2 = \frac{1}{2}a$$

$$F_3 = \frac{cd}{c+d}$$

$$= \frac{c^2 M_2}{c+cM_2}$$

$$= \frac{cM_2}{1+M_2}$$

For one type of comparison (call it type I), assume $M_1 = M_2$ and see if there is any saving of overall length, i. e. derive the formula for $$\frac{L_2}{L_1}$$

and then test actual cases to find when this ratio is less than unity. From above:

$$L_1 = a(1+M_1) = 2F_2(1+M_1)$$
$$L_2 = 2a+c+d$$
$$= 4F_2 + \frac{(1+M_2)^2 F_3}{M_2} \text{ (but } M_2=M_1\text{)}$$

Therefore $$\frac{L_2}{L_1} = \frac{2}{(1+M_1)} - \frac{(1+M_1)}{2M_1}\frac{F_3}{F_2}$$

The following table shows the value of this latter ratio for various magnifications and ratios of $F_3$ to $F_2$

| Magnification | $\frac{F_3}{F_2}$ | $\frac{L_2}{L_1}$ |
|---|---|---|
| 5 | 1 | .92 |
| 5 | ½ | .63 |
| 5 | ¼ | .48 |
| 10 | 1 | .73 |
| 10 | ½ | .46 |
| 10 | ¼ | .31 |
| 50 | 1 | .55 |
| 50 | ½ | .30 |
| 50 | ¼ | .17 |

Thus, although $F_2$ is selected large to gain a good size working clearance "$a$" and $F_3$ is selected small to get a high magnification without a large overall length, an 8% saving of overall length is accomplished at magnification 5 even when $F_3$ equals $F_2$. At magnification 50 there would be some saving even if $F_3$ were $1.8F_2$, i. e. even greater than $F_2$.

Fig. 8 is similar to Fig. 7 but employs an afocal lens system consisting of lenses 81 and 83 (focal lengths $F_4$ and $F_5$) with a telecenteric stop 82 in the mutual focal plane. An object at the point 80 is imaged at unit magnification at the point 84 in a field lens 85. This image is relayed by a second objective 86 (focal length $F_6$) to a point 87. This system (Fig. 8 which is similar to Fig. 4) may also be compared directly with that shown in Fig. 6:

$$F_4 = F_5 = a$$

$$\text{Magnification } M_3 = \frac{f}{e}$$

Overall length $L_3 = 4a+e+f$ $$= 4F_4 + \frac{(1+M_3)^2 F_6}{M_3}$$

Following the above discussed type (I) of comparison in which $M_3=M_1$:

$$L_1 = a(1+M_1) = F_4(1+M_1)$$

$$\frac{L_3}{L_1} = \frac{4}{1+M_1} + \frac{(1+M_1)}{M_1}\frac{F_6}{F_4}$$

The following table shows the value of this ratio for various magnifications and ratios of $F_6$ to $F_4$

| Magnification | $\frac{F_6}{F_4}$ | $\frac{L_3}{L_1}$ |
|---|---|---|
| 5 | ¼ | .967 |
| 10 | ½ | .914 |
| 10 | ¼ | .639 |

A second type of comparison of these three systems can be made by assuming a constant overall length (i. e. a fixed size of instrument) and then see how the magnifications compare, using various focal length lenses. This may be called "type II" comparison:

$$a = 2F_2 = F_4$$

$$L_1 = a(1+M_1) = 2F_2(1+M_1) = F_4(1+M_1)$$

$$L_2 = 2a + \frac{(1+M_2)^2}{M_2}F_3 = 4F_2 + \frac{(1+M_2)^2}{M_2}F_3$$

$$L_3 = 4a + \frac{(1+M_3)^2}{M_3}F_6 = 4F_4 + \frac{(1+M_3)^2}{M_3}F_6$$

When $L_1 = L_2 = L_3$:

| $M_1$ | $\frac{F_3}{F_2}$ | $M_2$ | $\frac{F_6}{F_4}$ | $M_3$ |
|---|---|---|---|---|
| 5 | 1 | 5.82 | ¼ | 5.82 |
| 5 | ½ | 13.9 | | |
| 10 | 1 | 15.9 | ½ | 11.9 |
| 10 | ½ | 34 | ¼ | 26 |
| 10 | ¹⁄₁₀ | 178 | ¹⁄₁₀ | 68 |

Thus in a given size instrument with a fixed working clearance, the arrangement shown in Fig. 7 gives higher magnification than that of Fig. 6 at all magnifications greater than 5 and all values of $F_3$ less than $F_2$ i. e. less than $$\frac{a}{2}$$

And the arrangement of Fig. 8 is better than Fig. 6 for $F_6$ less than $\frac{1}{4}F_4$ i. e. less than $$\frac{a}{4}$$

at magnification of 5 or more and for $F_6$ less than $\frac{1}{2}F_4$ i.e. less than $$\frac{a}{2}$$

at magnification of 10 or more.

At magnifications of 3 or less there is no gain; at a magnification of 4, $F_6$ must be less than $\frac{1}{6}F_4$ to gain anything in magnification and must be less than $\frac{1}{10}F_4$ to double the magnification. At a magnification of 5, $F_6$ less than $\frac{1}{4}F_4$ gives improvement and $F_6$ less than $\frac{1}{6}F_4$ doubles the magnification. At a magnification of 10, $F_6$ less than $\frac{1}{2}F_4$ gives improvement and $F_6$ less than $\frac{2}{7}F_4$ more than doubles the magnification, all in the same overall length of optical path. In general terms, a gain of about double magnification is achieved as long as $F_6$ is less than $$\frac{M-3}{2M-2} \cdot F_4$$

where M is the magnification available in a simple unrelayed (Fig. 6) system, when both the overall length and the working clearance are so fixed. Since in practice, optical comparators are usually concerned with magnifications of 10 or more and since a gain in magnification of 10% for a given overall length is valuable, all of this analysis of Fig. 8 can be expressed simply by pointing out that a preferred embodiment of the invention requires the system to have a magnification of 10 or more and $F_6$ to be less than $\frac{1}{2}F_4$.

Just as Fig. 4B shows a modification of Fig. 4 (or Fig. 8) to give double magnification in the first stage of the relay system, Figs. 9 and 10 differ from Fig. 7 by giving minification and positive magnification respectively in the first stage in each case. The lens 90 forms a reduced image at the point 91 which is relayed by lens 92 to the point 93. The lens 95 forms an enlarged image at the point 96 which is further enlarged by the lens 97 and focused on the screen 98. Any advantages which either of these systems have in gaining some improvement in certain aberrations or in the length of the system are outweighed by the automatic correction available at unit magnification as in Fig. 7 which thus is preferred. As pointed out above, even greater advantages are gained in going to an afocal system and hence Fig. 8 (same as Figs. 4 and 5) is much preferable over even Fig. 7.

What we claim and desire to secure by Letters Patent of the United States is:

1. An optical system for an optical comparator comprising a work holder, means for illuminating a work piece positioned on the work holder, an afocal first objective system consisting of two positive lenses separated by the sum of their focal lengths for receiving light from the work piece and for forming an aerial image thereof, a rear projection viewing screen and a second objective system optically aligned to receive light from the aerial image and to project a relayed image thereof onto the screen, the first objective being spaced a distance A, equal to more than six inches, from the work piece and the second objective having a focal length less than $$\frac{A}{2}$$

2. An optical system according to claim 1 in which the two lenses forming the first objective system are of equal focal length with distance A approximately equal said focal length, for forming said aerial image at unit magnification and the second objective system gives a magnification of at least 10 to the image on the screen.

3. An optical system according to claim 1 including a turret of interchangeable lenses of different focal lengths for the second objective system, one of said lenses being the second objective system at any one time.

4. An optical system for an optical comparator comprising a work holder, means for illuminating a work piece positioned on the work holder, a telecentric afocal lens system, consisting of two positive lenses optically separated by the sum of their focal lengths with the effective stop located in their mutual focal plane, for receiving light from the work piece and for forming an aerial image thereof, a rear projection viewing screen and a second objective system optically aligned to receive light from the aerial image and to project a relayed image thereof onto the screen.

5. An optical system according to claim 4 in which the two positive lenses of the afocal lens system have equal focal length giving unit magnification to the aerial image.

6. An optical system according to claim 5 in which the second objective system gives a magnification of at least 10 to the image on the screen and consists of an objective of focal length less than ½ of the focal length of either of the two lenses of the afocal lens system.

7. An optical system according to claim 4 in which the second objective system consists of an objective with its effective stop internal and a positive field lens between the afocal system and the objective, optically approximately at its focal length from said internal stop to focus thereon the telecentric stop of the afocal system.

8. An optical system according to claim 4 in which the second objective system gives a magnification of at least 10 to the image on the screen and consists of an objective with a focal length less than ½ the distance from the work piece to the first lens of the afocal system whereby the light from the second objective system to the screen covers a wide angle, and in which a positive Fresnel lens is included as a field lens substantially at said screen.

9. An optical system according to claim 4 in which an adjustable diaphragm is positioned in the mutual focal plane of the first two lenses, to act as the telecentric stop, at least at the smaller settings of the diaphragm.

JOHN R. TURNER.
RUDOLF KINGSLAKE.

REFERENCES CITED

The following references are of record in the file of this patent:

UNITED STATES PATENTS

| Number | Name | Date |
|---|---|---|
| 1,687,946 | Massiot | Oct. 16, 1928 |
| 1,763,482 | Scheppmann | June 10, 1930 |
| 2,078,586 | Richter | Apr. 27, 1937 |
| 2,085,671 | Powers | June 29, 1937 |
| 2,230,573 | Mestre | Feb. 4, 1941 |
| 2,349,989 | Reason | May 30, 1944 |
| 2,373,930 | Turrenttini | Apr. 17, 1945 |
| 2,414,867 | Gradisar et al. | Jan. 28, 1947 |
| 2,414,977 | Reid et al. | Jan. 28, 1947 |
| 2,430,549 | Altman | Nov. 11, 1947 |